Feb. 17, 1942.  G. H. CERVENKA  2,273,249
GAUGE FOR STOCK SAWS AND OTHER CUTTING MACHINES
Filed Jan. 29, 1940
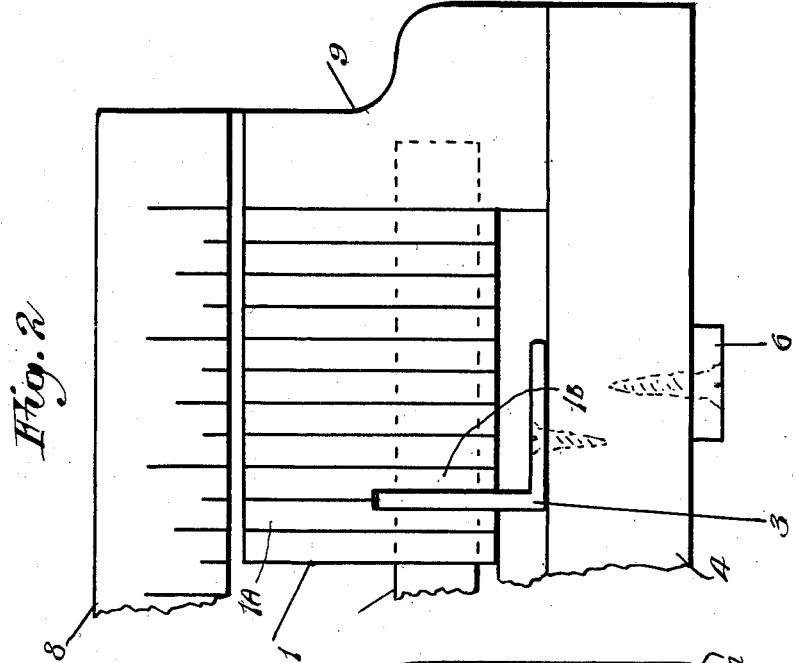
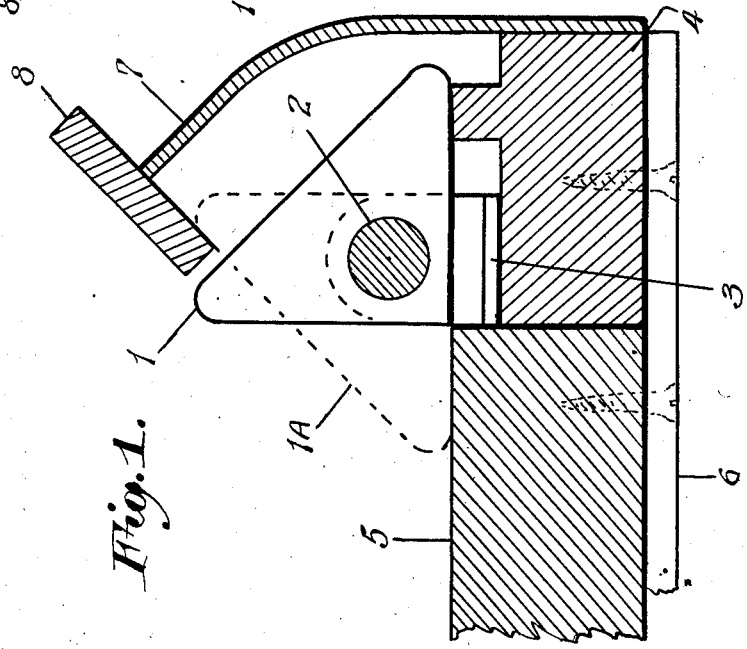

Patented Feb. 17, 1942

2,273,249

UNITED STATES PATENT OFFICE 2,273,249

GAUGE FOR STOCK SAWS AND OTHER CUTTING MACHINES

George H. Cervenka, Berwyn, Ill.

Application January 29, 1940, Serial No. 316,194

3 Claims. (Cl. 143—168)

My invention is a measuring gauge for saws and other cutting machines. It is ready for any measurement within its length and consists of the new features hereinafter shown, described and claimed.

On the drawing: Fig. 1 is the sectional side view. It shows the units of the gauge in normal position. The dotted lines show a unit tilted for measurement.

Fig. 2 is a front view of a section of the gauge, with the table removed. The units are in normal position forming a straight abutment, or guide fence against which the material to be cut will be pushed.

The gauge consists of any necessary number of preferably triangular units 1 mounted one next to the other on a common shaft 2 which is fastened by a number of brackets 3 to a wood or metal frame 4. Some of the triangular units 1B are milled out to accommodate said brackets 3 which are placed at necessary distances.

The multiplicity of units 1 thus form the gauge or abutment when in normal position. For a measurement, one of the units 1A is tilted forward.

Since the hole for the shaft 2 is near the rectangular corner of the unit 1, it will fall into place by its own weight when tilted forward or back.

The front or face edges of the units 1 are well rounded to avoid obstruction, when sliding lumber or other material to be cut along the face of the gauge.

The gauge is fastened to a saw or cutting table 5 by some convenient means 6.

For stock saws, each unit 1 may be ¼ inch in thickness as illustrated requiring 48 units per foot. For finer measures the units are reduced to the required thickness. The units may be made thinner or thicker depending on the type of the material to be cut.

The back of the gauge is protected by a shield 7 onto which the rule 8 is fastened. At either end of the gauge is an end bracket 9.

The gauge has been invented primarily for a stocksaw but can be used on many other machines.

I claim:

1. In a gauge for stocksaws and other cutting machinery, a combination of measuring gauge and guide fence or abutment, consisting of any number of uniform flat units of necessary shape, size and thickness, set on edge next to one another and pierced by a shaft outside their center of gravity, so that said units may be individually tilted forward and back and remain in their respective positions of their own weight; some of said units being milled out to accommodate a number of brackets disposed to hold said shaft in place, said brackets being fastened to a saw table or frame thereof; the combination of the units, tilted back, shaft and brackets forming a work guide or abutment and the individual units when tilted forward, furnishing measurements in step with unit thickness, within the range of the gauge.

2. In a gauge for stocksaws and other cutting machinery, a guide fence or abutment to be mounted on a saw table, consisting of a certain number of flat uniform units, preferably triangular in shape, of necessary size and thickness, set on edge next to one another in such a way, that the face edge forms a right angle to the sawtable, thus forming the uninterrupted work guide or abutment; said units being pierced outside their center of gravity by a shaft, acting as a pivot for said units, so that a selected one of said units may be individually tilted forward and remain in position of its own weight, thus furnishing the measurement selected; some of the units being milled out to accommodate a number of brackets placed at convenient intervals, for the purpose of supporting said shaft, the bracket being fastened to the sawtable or frame thereof, the whole forming a guide fence or abutment and measuring gauge combined.

3. In a gauge for stocksaws and other cutting machinery, a combination of a work guide or abutment and measuring gauge consisting of a multiplicity of right-triangular units, of optional size and thickness, set on edge, one next to the other, the units each having a hole near its right angle, to accommodate a shaft for the purpose of holding said units in place and to serve as a pivot so that said units may be individually tilted forward and back, and remain in corresponding position of their own weight; a necessary number of brackets, pierced by said shaft and fastened to a sawtable or frame, at convenient intervals, to hold said shaft in place; some of the units being milled out to accommodate said brackets; the combination of units, brackets and shaft thus forming a straight solid guide fence or abutment when tilted back, and a selected unit tilted forward furnishing a corresponding measurement within the range of the gauge.

GEORGE H. CERVENKA.